United States Patent [19]
Brinkmann et al.

[11] 3,965,321
[45] June 22, 1976

[54] DRYING OF STORAGE BATTERY PLATES

[75] Inventors: Jurgen Brinkmann, Hagen; Wilhelm Saul, Hannover, both of Germany

[73] Assignee: Varta Batterie Aktiengesellschaft, Hannover, Germany

[22] Filed: Sept. 5, 1974

[21] Appl. No.: 503,316

[30] Foreign Application Priority Data
Sept. 24, 1973 Germany............................ 2348042

[52] U.S. Cl.................................. 219/10.41; 34/1; 136/64; 219/10.49; 219/10.57; 219/10.69
[51] Int. Cl.²........................................... H05B 5/08
[58] Field of Search........... 219/10.49, 10.41, 10.69, 219/10.71, 10.79, 6.5, 10.57, 10.67, 10.61, 10.53; 29/2; 34/1; 136/64

[56] References Cited
UNITED STATES PATENTS

| | | | |
|---|---|---|---|
| 2,005,901 | 6/1935 | Long............................ | 219/10.79 X |
| 2,647,982 | 8/1953 | Baker........................... | 219/10.79 X |
| 2,702,847 | 2/1955 | Schmidt....................... | 219/10.69 X |
| 2,848,566 | 8/1958 | Limpel......................... | 219/10.69 X |
| 3,041,434 | 6/1962 | Alf................................ | 219/10.41 |
| 3,356,354 | 12/1967 | Beljav et al. .................... | 219/10.69 |
| 3,400,009 | 9/1968 | McDermott et al. ......... | 219/10.69 X |
| 3,850,205 | 11/1974 | Frailly.......................... | 219/10.67 X |

FOREIGN PATENTS OR APPLICATIONS
873,579  4/1953  Germany

*Primary Examiner*—Bruce A. Reynolds
*Attorney, Agent, or Firm*—Weiser, Stapler & Spivak

[57] ABSTRACT

Pasted storage battery plates are dried by subjecting them to an alternating magnetic field which induces heating of the plate grids, thereby drying the paste from the inside.

36 Claims, 18 Drawing Figures

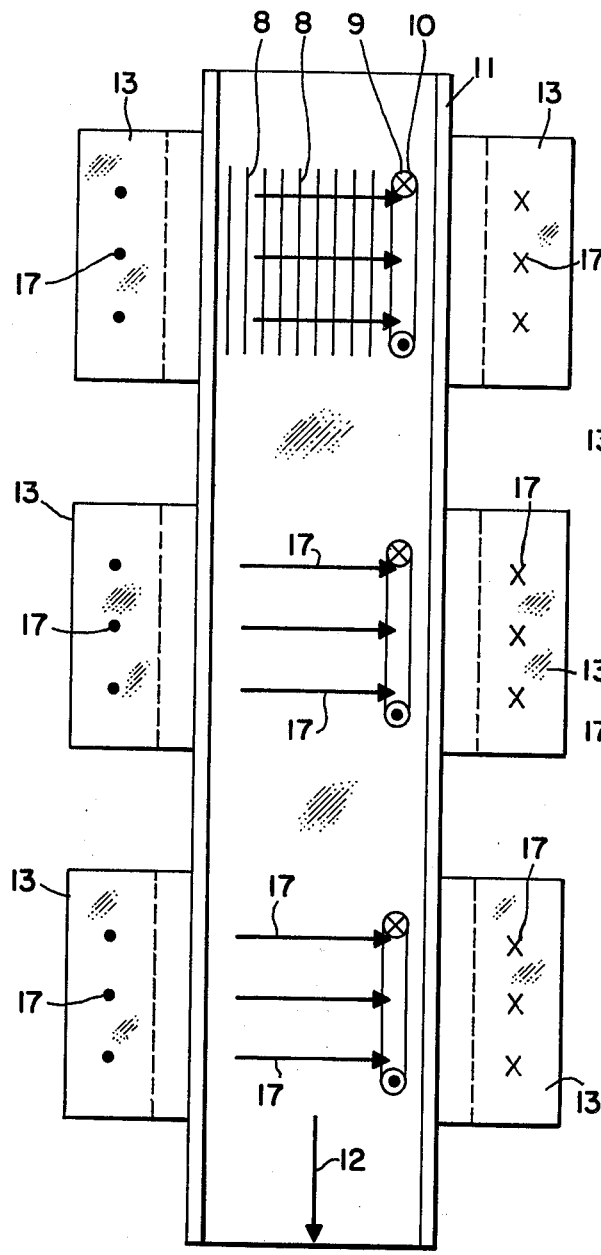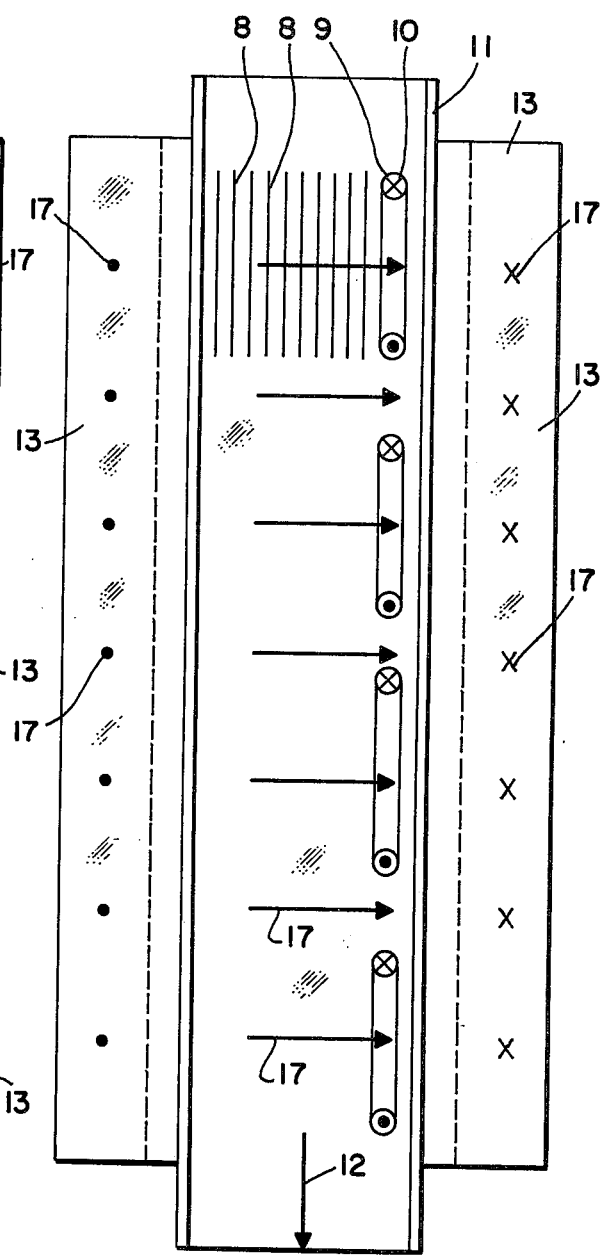

DRYING OF STORAGE BATTERY PLATES

The invention relates to a method and apparatus for drying storage battery plates.

Storage battery plates are subject to several drying operations during their manufacture. These drying procedures are effected, according to the prior art, by placing individual plates into a stream of heated air or gases. In this way, the plates are dried, starting at the surface. By extending the process over a longer period, it is possible to a limited extent to also drive off the moisture from the interior of the active mass.

Another method involves contacting the storage battery plates with heated metal plates, whereby the heat is transmitted to the storage battery plates, the temperatures of which increase while moisture is removed from the interior of the active mass.

Both methods have considerable disadvantages, connected mainly with the purpose to be achieved by the drying operation. They therefore depend on the particular drying procedure, which is performed during the course of plate manufacture.

In manufacturing storage battery plates, it is necessary to dry the freshly pasted plates and to warm them simultaneously. These two procedures trigger the so-called "curing process", in which the metallic lead ($Pb_{met}$) content of the active mass is reduced through oxidation to the lowest possible value.

During this warming and drying operation with heated air or gases, the pasted mass in the grids of the plates is dried starting at the surface. This procedure is normally very time-consuming, because it is difficult to remove the moisture from the inner, still pasty mass through the already dried surface.

For efficient manufacture, air or gas at relatively high temperatures is frequently used for the heating and drying operation. The resultant rapid drying of the active mass on the surface of the plates causes mechanical shrinking of the mass in these regions. The interior still pasty mass cannot change its volume, nor can the surrounding drying mass compensate for the mechanical stresses, arising from the shrinking process. Consequently, cracks appear on the surface of the mass, and these extend into the interior of the plate during further drying. There they join with other cracks, originating on the opposite side of the plate, so that cracks ultimately extend clear through the entire active mass of the plate.

In late stages of the drying process, the initially dried and cracked surface of the active mass solidifies in such a manner that it no longer yields when the inner mass shrinks. Consequently, the inner mass shrinks onto the outer solidified mass, whereby the active mass is partly or even completely detached from the grid. By photomicrographs and X-ray pictures it can be shown that certain ones of the cracks visible in the surface of the dried mass extend all the way to the grid within the active mass, and then continue along the boundary between grid and active mass. Thus, true separation between mass and grid exists.

Formation of cracks in the active mass of the storage battery plate also leads to other considerable disadvantages. The inadequate mechanical connection between grid and active mass leads, during manufacture as well as during operation of the battery, to inevitable crumbling away of active mass from the grid, causing many production rejects, as well as rapid breakup of the plates, followed by reduced operating efficiency of the battery. A further disadvantage is the inconvenience and danger to manufacturing personnel from crumbling away of the mass, which leads to costly precautions to reduce such exposure.

Another disadvantage is that the detaching of active mass from the grids leads to faulty contact between these elements, thereby impeding current flow from the active mass to the lead conductor and vice versa. This leads to an increase in the internal resistance of the battery and therefore to a reduction of the terminal voltage and load capacity, particularly at high load currents. This disadvantage is especially prominent during the first few cycles of operation, i.e., during the first discharges of a dry charge battery and during acceptance testing.

A further disadvantage of the cracks produced by the conventional drying method is the breaking of the electrical contact within the active mass and a consequent considerable reduction in conductivity of the mass between grids.

A further disadvantage is the greater corrosion of the grid exposed by the detached active mass, which results in a further increase of the contact resistance between active mass and lead grid conductor. Such increased corrosion can even cause premature fracture of the grid.

Subsequent drying operations during manufacture, performed mainly to remove moisture from the interior of previously formed and charged plates, have the same disadvantage. The heat has to be applied from the outside to the active mass, and only a slow and time-consuming drying effect is possible, because the moisture escapes only with difficulty from the interior through the already dried region. As is known, it is desirable to dry the formed plates as quickly as possible, not only for efficient production, but to prevent undesired oxidation of the formed plates.

From German Pat. No. 873,579, a drying method for formed negative plates is known, wherein the plates are heated in a vacuum by means of an electro-magnetic, high-frequency field. The plates are introduced into a vacuum chamber, surrounded by a coil. Such equipment permits only non-continuous drying and the procedure is very time consuming.

Accordingly, it is an object of the invention to overcome the disadvantages of the above described methods and to provide a method and apparatus for the drying of storage battery plates through inductive heating utilizing a magnetic field, which makes possible the rapid drying of plates of various dimensions.

This and other objects which will apppear, are achieved, according to the invention, by placing the plates side by side on a carrier, and then continuously moving the carrier through a drying tunnel traversed by a magnetic flux perpendicular of the plate surface.

An alternating electro-magnetic field induces in the plate grids electrical voltage which cause heavy current to flow, due to the short circuit formed by the grids. Because of the low heat capacity of the lead, this current causes rapid heating of the grids. The heat is transferred from the grid to the surrounding active mass, whose temperature is thereby raised. The moisture in the active mass is thereby caused to evaporate.

This inductive drying of storage battery plates yields several advantages: The heat is produced within the plate grid and therefore heats the active mass from the inside. This causes first evaporation of the moisture near the grid. In this way, the moisture can be rapidly driven out from the interior of the active mass. At the same time the moisture in the outer regions of the active mass is forced to the plate surface. Thus, the drying process can be performed relatively rapidly and with economy of time. Since the inductive drying has high efficiency, it uses less energy than conventional methods.

Another considerable advantage is that the above-described shrinking process of the active mass, caused by drying out, begins right at the grid. The active mass is thereby firmly shrunk onto the grid, resulting in good mechanical and electrical contact between the active mass and grid surface, with low internal plate resistance and favorable battery terminal voltage.

Still another advantage is the following. Since the shrinkage starts at the grid, moist and malleable mass remains available in the middle and on the surface of the mass. This mass yields during the entire shrinking process, so that no appreciable mechanical stresses arise, and the formation of cracks in the plate mass is averted, again leading to good electrical conductivity of the mass bodies.

This shrink-on process and the resulting absence of cracks also considerably increases the mechanical stability of the active mass and its mechanical connection to the plate grids. This appreciably reduces the crumbling away of active mass during manufacture and during battery operation.

In addition, inductive drying of storage battery plates, immediately following pasting, leads to a speed-up of the curing process. With prior methods, the curing process for lowering the $Pb_{met}$ content of the active mass to a few percent has required a period of 4–6 days. This made necessary a lot of interim storage and also had other disadvantages.

Plates which are inductively dried, immediately after pasting, show a remarkably rapid decrease of the $Pb_{met}$ content to the same low values in the subsequent curing process even though everything else is the same, so that the process is completed in a substantially shorter period. It thereby becomes possible to eliminate the usual interim plate storage in the curing chamber after pasting and to transport the plates, by means of chain conveyors or the like, in the space of a few hours through the curing chamber on a continuous basis. This saves much expense.

By suitable control of temperature and humidity in the curing chamber, relative to the duration and intensity of the preceding inductive plate-drying operation, the drying and curing process can be optimized.

The advantages of this inductive plate drying are primarily attributable to the fact that the moisture is driven from the interior of the active mass toward the exterior. However, under some circumstances it is desirable to additionally expose the plates to a heated air or gas stream, so that the moisture, driven to the outside can be thoroughly removed from the plate surface. In that case, it has proven desirable to start this stream only after drying through inductive heating has already progressed to a certain extent.

The described advantages of inductive plate drying are not confined to that drying process which follows immediately after pasting, and which has been described in detail above. Rather, they apply also to all other drying operations, which are involved in the manufacture of storage battery plates.

For further details, reference is made to the discussion which follows, in the light of the accompanying drawings, wherein FIG. 1 is a schematic diagram of a plate and magnetic field for illustrating the principle of the invention;

FIGS. 3 through 13 illustrate various embodiments of continuous drying arrangements embodying the invention, with different views of the same embodiments being shown in some of these figures.

The same reference numerals denote similar elements throughout.

Figure 1:
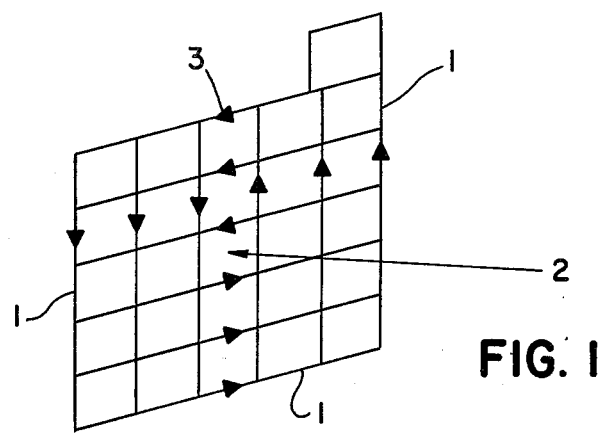

FIG. 1, to which reference may now be had, shows a schematic drawing of the grid of a storage battery plate. Reference numeral 1 designates the rods of the grid, and reference numeral 2 the arrow representing magnetic alternating flux passing through the storage battery grid perpendicularly to the plate plane. Arrows 3 show the alternating current, caused by the voltage induced by magnetic field 2 to flow within the short circuit formed by grid rods 1. A frequency between about 100 and a few thousand Hertz has proved to be desirable for the alternating magnetic field, because this tends to provide an optimum relationship between induced voltage and the known current displacement produced by the magnetic field. At this frequency, the induced alternating voltage is high enough to produce sufficient current in the short circuited grid rods; on the other hand, the current displacement is not pronounced enough to relocate the current flow appreciably toward the marginal rods 1 of the grid. At this optimum frequency, there takes place rapid heating and nearly evenly over the entire plate area.

It has been shown that magnetic fields of low strength in the range of a few hundred Gauss, already cause rapid heating of the plates. Therefore, only low magnetic field intensity and little electric power is necessary, thus inductive drying equipment is technically practicable and economically operable.

Figure 2:
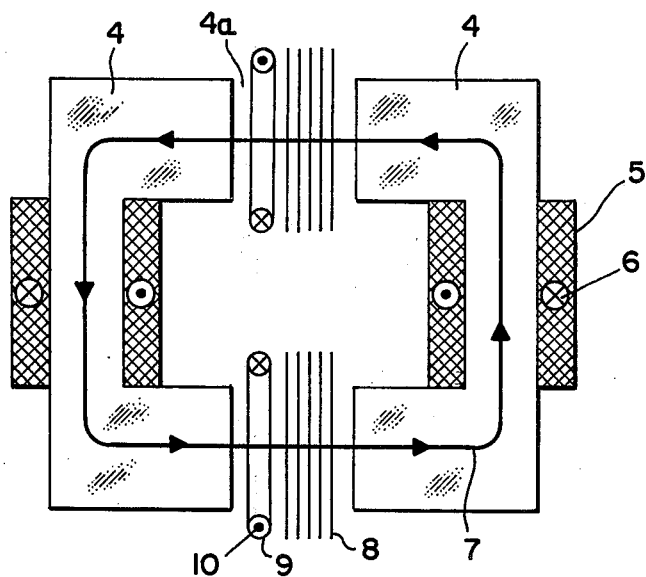
FIG. 2 shows, in simplified manner, a drying arrangement according to the invention.

FIG. 2 shows a simple arrangement for inductive plate drying comprising two magnetic cores 4, which consist of core laminations. There are also coils 5 which produce the alternating magnetic flux 7, by means of the alternating current 6 flowing in said coils. This flux traverses the grids of plates 8 and produces there an alternating current. The short circuit represented by a given grid is represented at 9. The induced current and its direction is denoted by the usual dot and cross symbols 10.

The arrangement of FIG. 2 is suitable for discontinuous plate drying. The plates 8 are brought for a few seconds into the air gap 4a between the two magnetic cores 4. Because of the low magnetic induction needed, the length of the air gap 4a, i.e., the distance between the two magnetic cores, may be large. It is therefore possible to bring several plates simultaneously into the air gap 4a for inductive drying.

Figure 3:
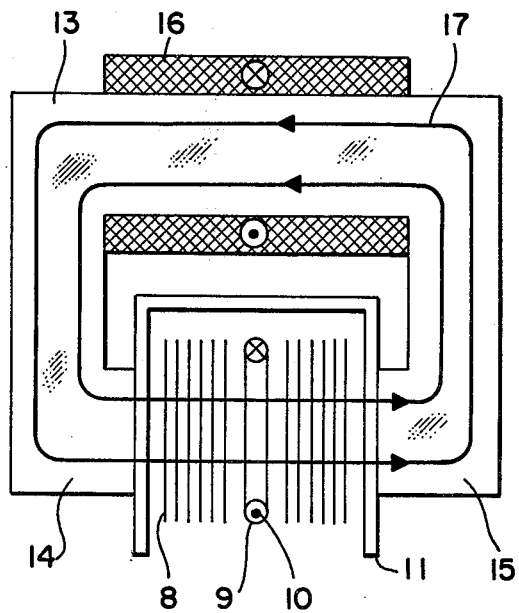

FIGS. 3 and 4 show, in a sectional view and in a plan view, from below, respectively, an especially desirable arrangement of a tunnel and energizing elements, with which plates are inductively dried during continuous passage. This arrangement comprises a tunnel 11 of synthetic or other material having high electrical resistance but permeable to the magnetic flux, so that no eddy currents can be induced. The tunnel 11 may be completely enclosed or preferably it may be open toward the bottom.

The plates 8 to be dried are placed serially on a plate carrier (not shown) and are slowly transported by a conveyor belt (also not shown) through the tunnel in the direction indicated by arrow 12. The magnet yoke 13 of core laminations surrounds tunnel 11, so that the two poles 14 and 15 are adjacent the longitudinal sides. Coil 16 produces an alternating magnetic flux 17, inducing a current 10 in plates 8. The direction of current 10 is shown in the equivalent short circuit 9. The poles of the electromagnet and the storage battery plates transported through the tunnel are arranged in such a manner that the alternating magnetic field traverses the plate plane at right angles.

For inductive drying of plates of different dimensions in the same equipment, the vertical level of the conveyor belt with its plate carrier can be adjusted, so that the centers of plates 8 always remain at substantially the same height relative to the centers of poles 14 and 15. Under these circumstances, the arrangement operates highly effectively with any plate dimension. It is also possible to vary the energizing current of coil 16 both as to frequency and as to intensity, to achieve optimum drying results. Moreover, the transport velocity of the plates through tunnel 11 is variable.

FIG. 5 shows an arrangement, corresponding in essence to that of FIGS. 3 and 4, with the difference that only one magnetic core 13 of extended length surrounds tunnel 11, instead of several separate cores. The direction of the alternating magnetic flux 17 and the transport direction of plates 8 are the same as in FIG. 4.

Figure 6:
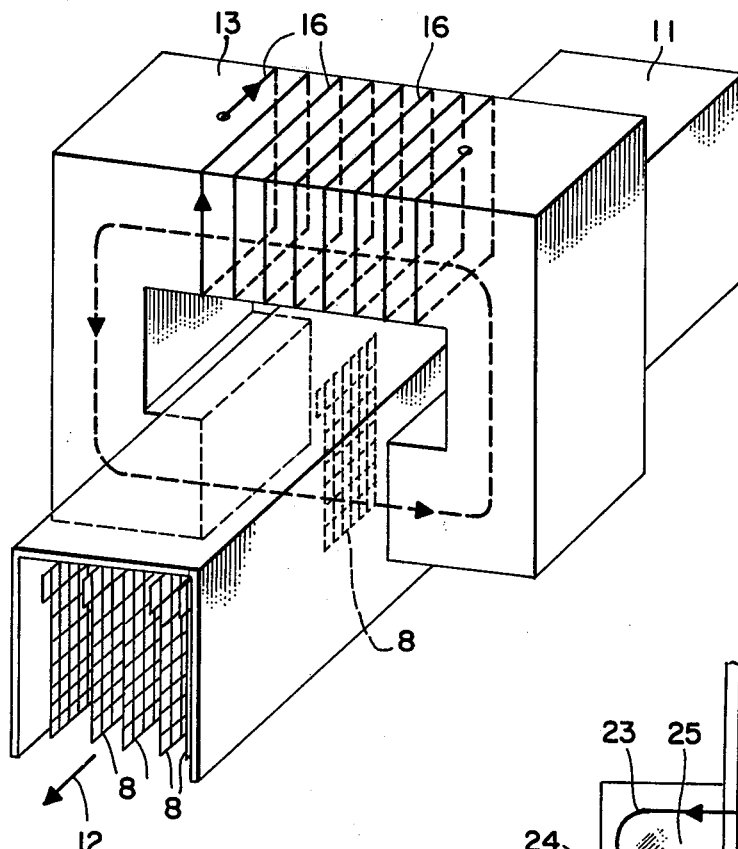

FIG. 6 shows the arrangement of FIGS. 3 and 4 in perspective. Only one magnet core 13 is shown adjacent tunnel 11, with a symbolically indicated winding 16. Only those plates 8 are indicated, which are emerging from the tunnel or happen to be between the poles of core 13.

In the arrangements shown in FIGS. 3, 4, 5 and 6, the plates 8 to be dried are placed serially on a carrier right from the pasting machine and are then passed in groups through tunnel 11.

Figure 7:
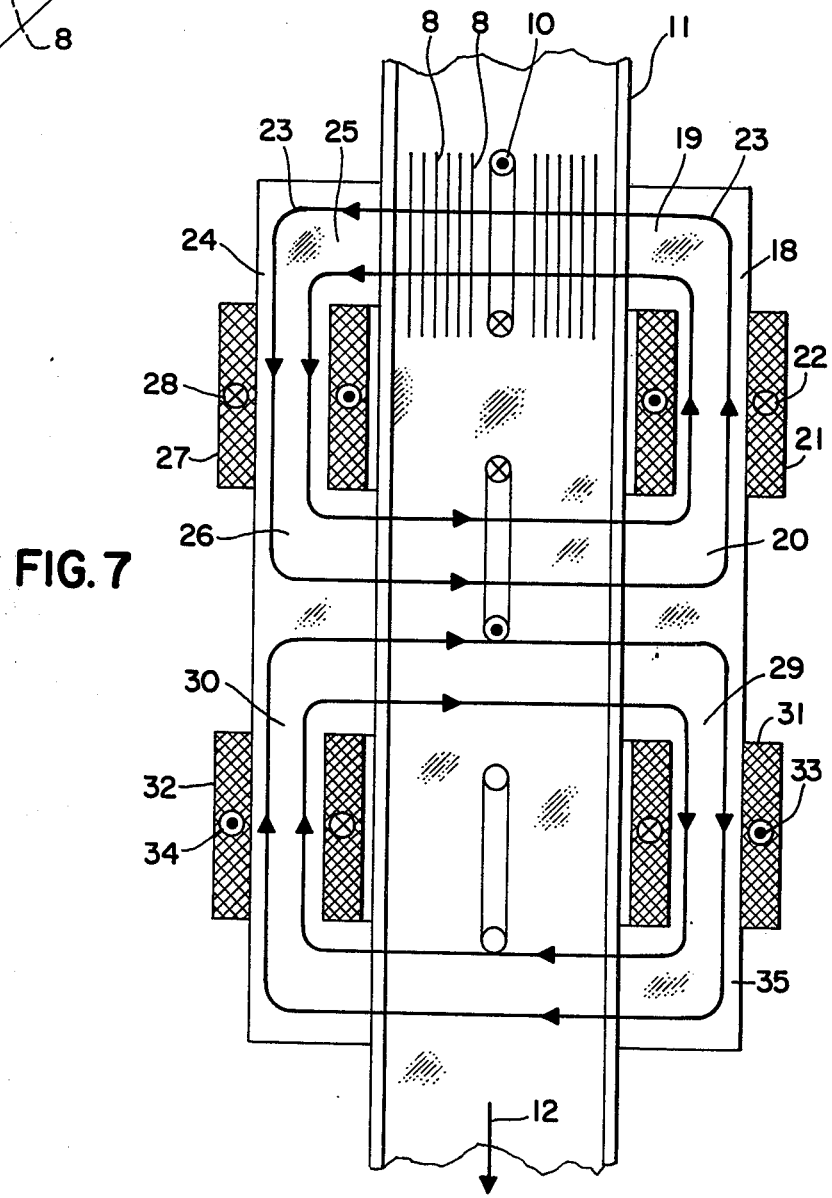

FIG. 7 shows another embodiment. An iron core 18 is placed with both its poles 19 and 20 on the same longitudinal side of tunnel 11. The energizing winding is symbolized at 21 and the current at 22. The resultant alternating flux is shown at 23. In plates 8, transported in direction 12, a current 10 is again induced as previously described. On the opposite side of tunnel 11, another iron core 24 is positioned, with poles 25 and 26 and winding 27, wherein current 28 flows through winding 27 in such a manner as to produce flux 23 in the indicated direction. During transport of plates 8 in direction 12, the plates move from the influence area of poles 19, 25 into that of poles 20, 26. Since the spatial orientation of the magnetic flux 23 in these two areas differs by 180° the current induced in plates 8 in the influence area of poles 20, 26 is also electrically phase-shifted by 180° relative to the plate current in the area of poles 19, 25. Further, in transport direction 12 iron cores 18 and 24 are followed by similar cores 29 and 30 with windings 31 and 32 so connected that the electric currents 33 and 34 shift the alternating magnetic flux 35 by 180° relative to flux 23, in its passage through cores 29 and 30 and tunnel 11.

Figure 8:
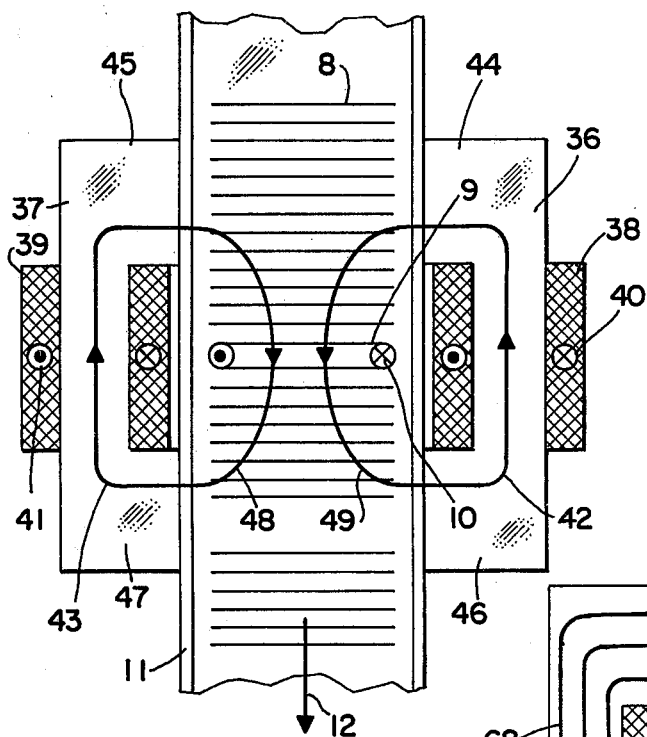

FIG. 8 shows still another embodiment. Cores 36, 37 are placed adjacent the longitudinal sides of tunnel 11 in the same way as in FIG. 7. Windings 38, 39 are so connected that currents 40 and 41 produce magnetic fields 42 and 43. These are phase-shifted by 180° in the area of oppositely placed poles 44, 45 and 46, 47 respectively. The flux now traverses the tunnel parallel to the transport direction 12 as indicated by lines 48, 49 within tunnel 11. In the grid 9, drawn as a short-circuited turn, current is induced in the indicated direction 10. Additional iron cores and their energizing windings (not shown) must then be connected in such a way that any two successive poles are traversed by the magnetic flux in the same direction. To meet the requirement that the alternating magnetic field for the current induction traverses the grid perpendicularly the plates 8 in the embodiment of FIG. 8 are oriented with their planes at right angles to the transport direction 12. This has the advantage, that the plates can be placed on the conveyor just as they come from the pasting machine, without having to be turned, and that they can be continuously transported through drying tunnel 11.

Figure 9:
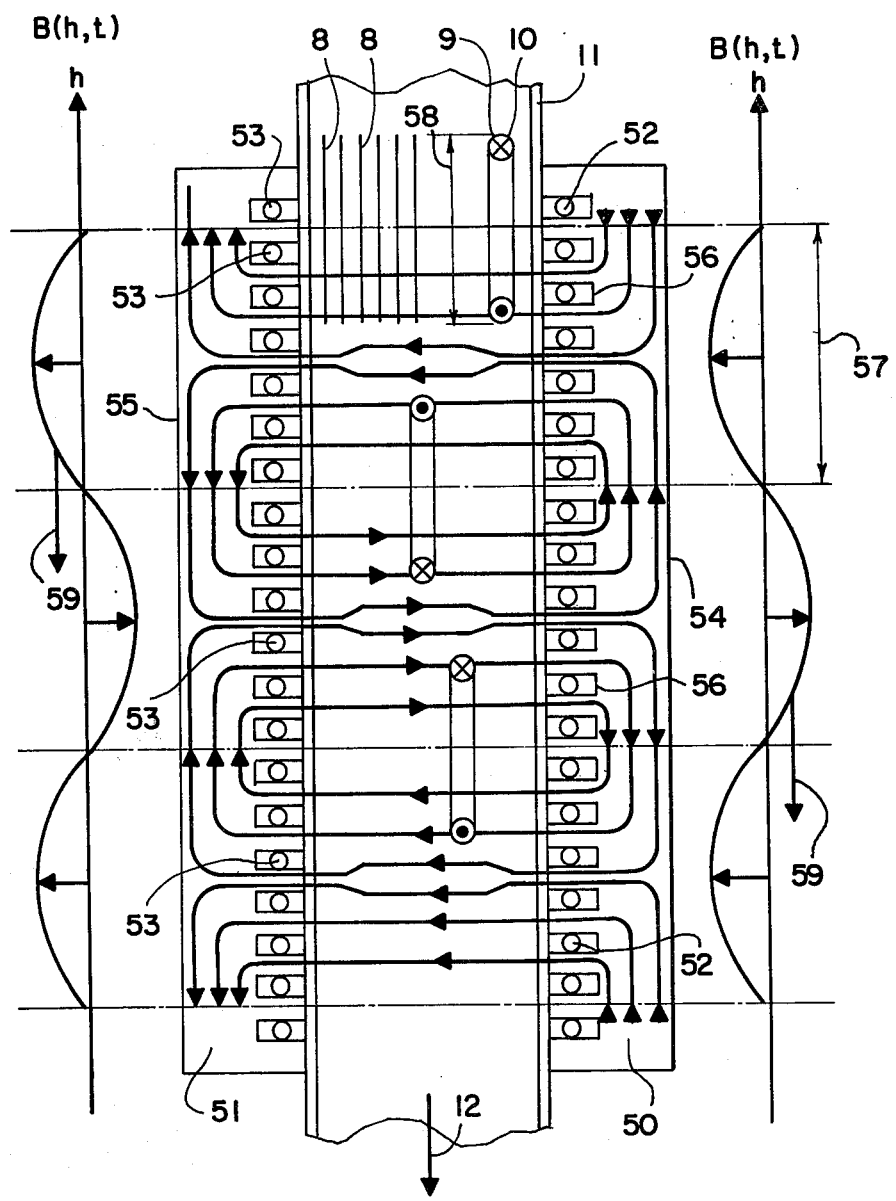

FIG. 9 shows a drying tunnel at the longitudinal sides of which so-called linear exciter elements 50, 51 are provided. These linear exciter elements have linearly distributed, three-phase windings 52 and 53, respectively, located in channels 56 of iron yokes 54 and 55, respectively, which are built up of core laminations. These three-phase windings 52 and 53 are wound so as to produce a linearly extending sinusoidal induction wave along tunnel 11. FIG. 9 shows, to the right and left of the linear exciter elements 50 and 51, respectively, the field distributions $B(h,t)$ along these exciter elements. The pole pitch 57 of exciter windings 52, 53 is equal to the pitch of the induction wave 57. This is preferably chosen to be about equal to the width 58 of plate 8, to be dried. The exciter windings 52, 53, distributed along tunnel 11 are connected in the same phases. The induction waves $B(h,t)$, produced by these windings have the same relationship. Consequently, the lines of magnetic field in the region of one pole segment flow from one linear exciter element 50 to the other element 51 at right angles to transport direction 12 through tunnel 11. On the other hand, the magnetic flux in the region of the next pole flows in the opposite direction, namely, from linear exciter element 51 to element 50. Because the three-phase windings 52 and 53 are fed with three-phase current, the induction waves $B(h,t)$, and with them the lines of the magnetic field in tunnel 11, move in direction 59, which is the same as transport direction 12. Their velocity is determined by the frequency of the three-phase current and the pole pitch of the three-phase exciter windings 52 nd 53. The magnetic field lines within tunnel 11 thereby induce alternating currents 10 in plates 8, which are to be thought of as shorted turns 9. Because of the sinusoidal distribution of the induction waves $B(h,t)$ the plates 8 at different locations in tunnel 11 are traversed by alternating currents 10 which are phase-shifted relative to each other. In the embodiment of FIG. 9, the planes of plates 8 are passed through tunnel 11, oriented parallel to transport direction 12.

Figure 10:
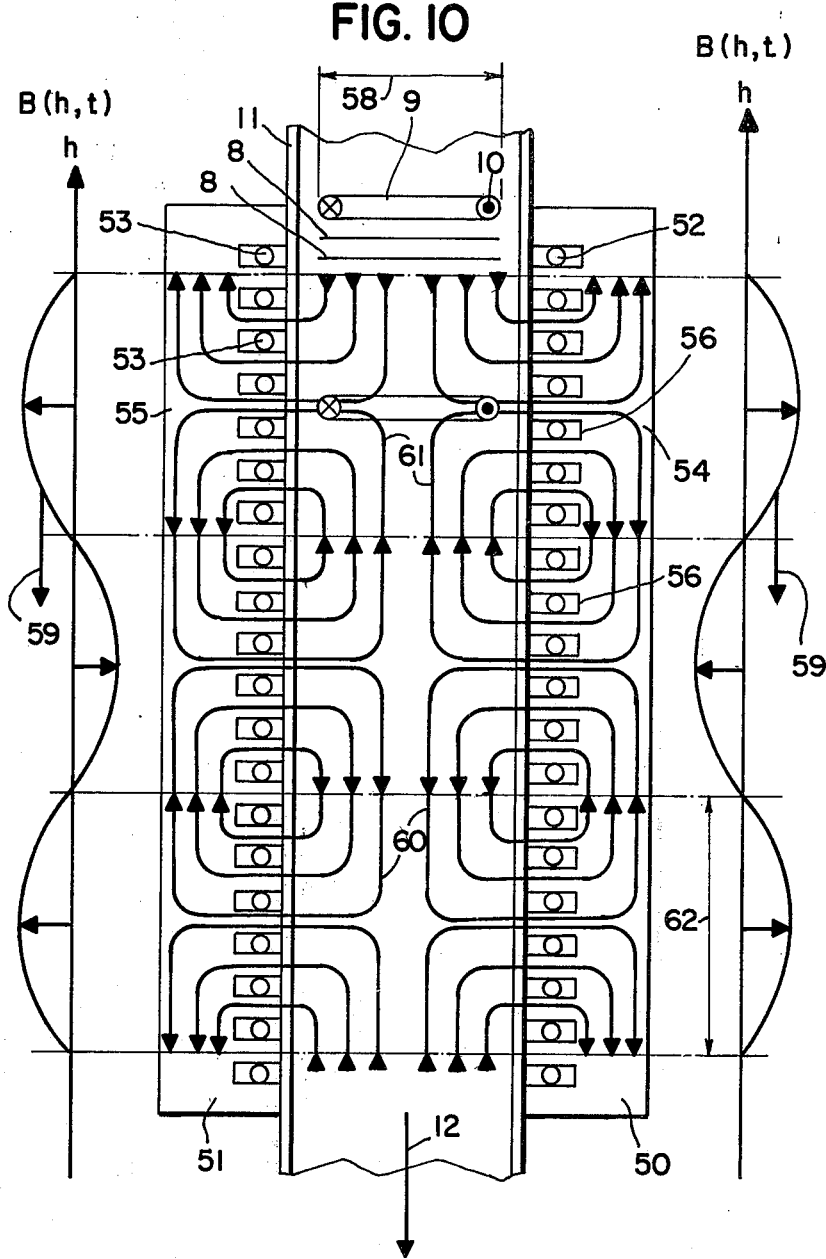

FIG. 10 shows a further embodiment, which corresponds in substance to that of FIG. 9. The difference is that the three-phase windings 52 or 53 housed in linear elements 50 and 51 are connected in such a manner that the induction waves $B(h,t)$ respectively produced by them, are in phase opposition to one another. This causes the lines of the magnetic field to go in and out of the tunnel in opposite directions in directly opposite areas of tunnel 11. A magnetic field thereby exists in tunnel 11, whose lines 60 and 61 are generally parallel to transport direction 12. Due to the supply of the three-phase exciter windings 52 and 53 with a three-phase current, the induction waves B($h,t$) and with them the lines of fields 60 and 61 travel within the tunnel 11 in the indicated direction 59. Their velocity again depends on the frequency of the three-phase current and the pole pitch 62 of the three-phase windings.

The arrangement of FIG. 10 has certain advantages over that of FIG. 9.

The planes of plates 8, to be dried, must pass through tunnel 11 at right angles to transport direction 12, so that high current can be induced in the grid by the magnetic field. In this plate orientation continuous transport through tunnel 11 is possible and turning of the plates leaving the pasting machine is unnecessary. Another advantage is that the pole pitch 62 is independent of the width of plates 8, due to the prevailing magnetic relationship. The pole pitch 62, therefore, can be chosen to provide the desired induction wave velocity at any given frequency (such as that of the power lines). This, together with concurrent adjustment of the strength of the magnetic induction in tunnel 11, makes it convenient to adjust the drying device for optimum operation.

Figure 11:
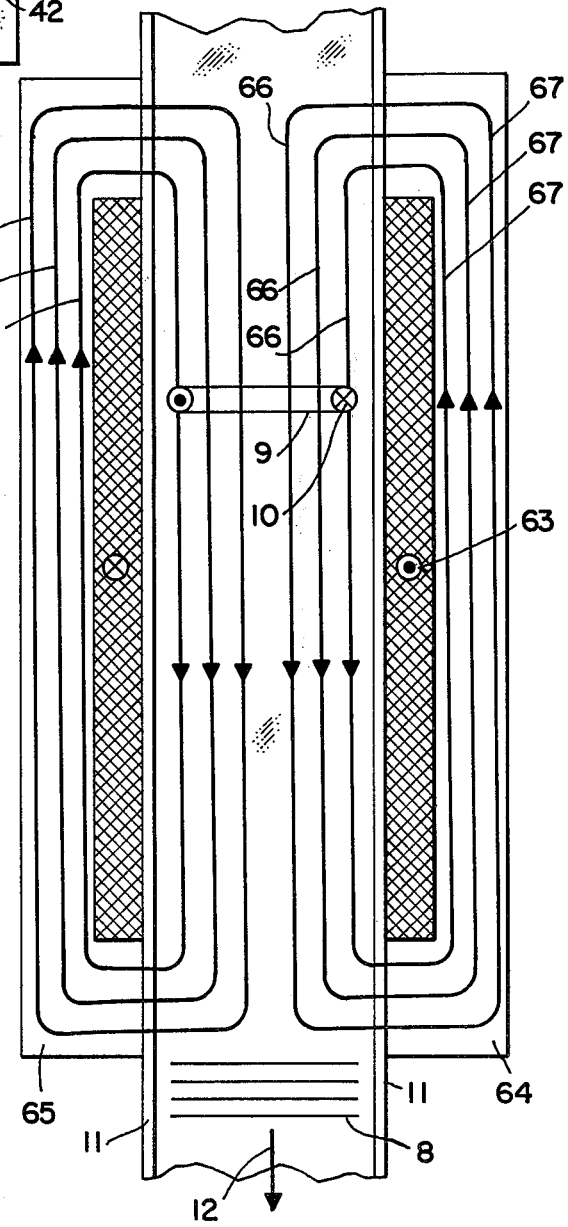

FIG. 11 shows another embodiment of an inductive drying device in a sectional view taken parallel to the axis of tunnel 11.

Figure 12:
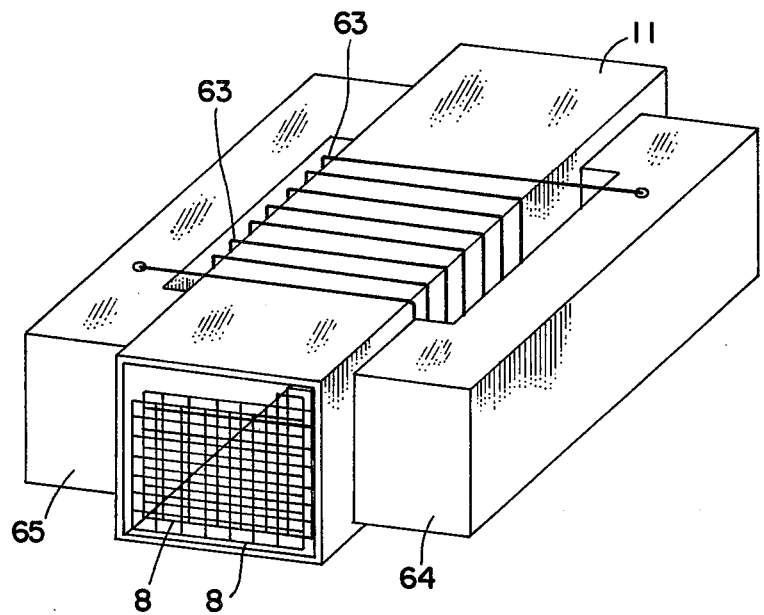

FIG. 12 shows in perspective the same arrangement as FIG. 11. In this arrangement, tunnel 11 is closed on all four longitudinal sides. A winding 63 distributed along the transport direction 12 is continuously wound around the tunnel in such a manner that the planes of the annular turns are at right angles to transport direction 12. By supplying alternating current to winding 63 an alternating magnetic field is set up in tunnel 11, the magnetic field lines 66 of which extend generally in parallel to the tunnel. Cores 64 and 65 of laminations provide the armature and lower the intensity of alternating current needed to produce the desired magnetic flux in tunnel 11. The magnetic flux within the armatures is designated 67 and 68. The alternating flux within the tunnel induces an alternating current 10 in the shorted turns 9 of grid 8, which has uniform phase and approximately uniform strength during travel of the grid through the tunnel segment surrounded by winding 63. Armatures can be provided on all four longitudinal sides of tunnel 11. It has been shown that it is sufficient and more economical, if the armatures are provided only on two opposite sides of tunnel 11, as shown in FIGS. 11 and 12.

For a complete drying arrangement, it is advantageous to provide several drying tunnels such as shown in FIGS. 11 and 12, the plates passing through successive tunnels consecutively. A further advantage of this arrangement is that the magnetic field is concentrated within tunnel 11 by the annular winding 63, and the magnetic induction within the tunnel remains approximately uniform along energizing winding 63. It is also advantageous that there are no substantial regions of stray fields between the annular winding 63 and plate grids which again pass through tunnel 11 at right angles to their transport direction 12. This causes particularly favorable voltage induction in the plate grids, for any given exciting current and resulting magnetic field, so that the efficiency of the overall arrangement is very high.

The disadvantage of this embodiment (FIGS. 11 and 12) is that the completely closed tunnel makes it difficult to clean out, mass particles may crumble away. Also the dimensions of the plates to be dried cannot be varied completely at will, since the tunnel diameter cannot be changed. Difficulties of construction may also be encountered if it is additionally desired to use heated air or gas for plate drying.

Figure 13:
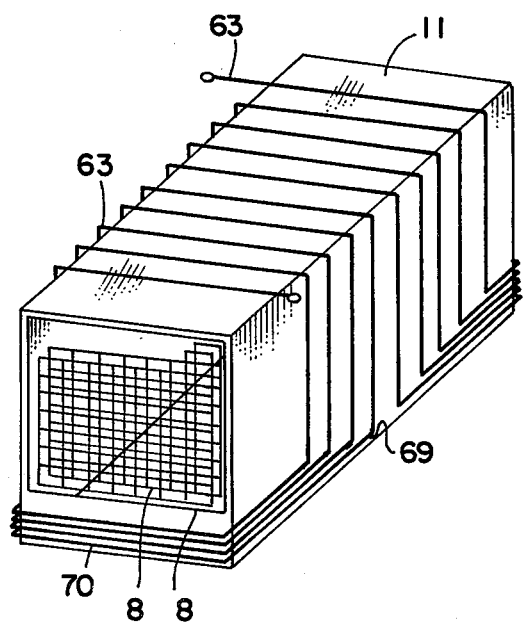

FIG. 13 shows an arrangement containing a tunnel, which is open towards the bottom. The winding 63 is uniformly distributed on both side walls and the top of the tunnel. At the bottom, the winding is concentrated as shown at 69 and led along the walls toward the head ends of the tunnel, where it extends as concentrated winding 70 from one side wall to the other. This special winding arrangement yields the same magnetic effect as the annular winding according to FIGS. 11 and 12. However, it has the advantage that tunnel 11 is open towards the bottom, so that it can be easily cleaned. Also plates of different heights can be dried, since the tunnel construction imposes only limited bounds on plate height.

Moreover, heated air and gases can be easily introduced into the tunnel from below to achieve the above-described combination heating.

FIGS. 14 – 18 show several arrangements for passing the plates 8 through the drying tunnel 11, according to the invention.

In case the direction of the magnetic field calls for passing the plates through the tunnel at right angles to the side walls, a conveyor belt or chain is used, which can be guided and supported within the tunnel, and driven at variable speeds by a suitable electrical system located outside the tunnel.

Figure 14:
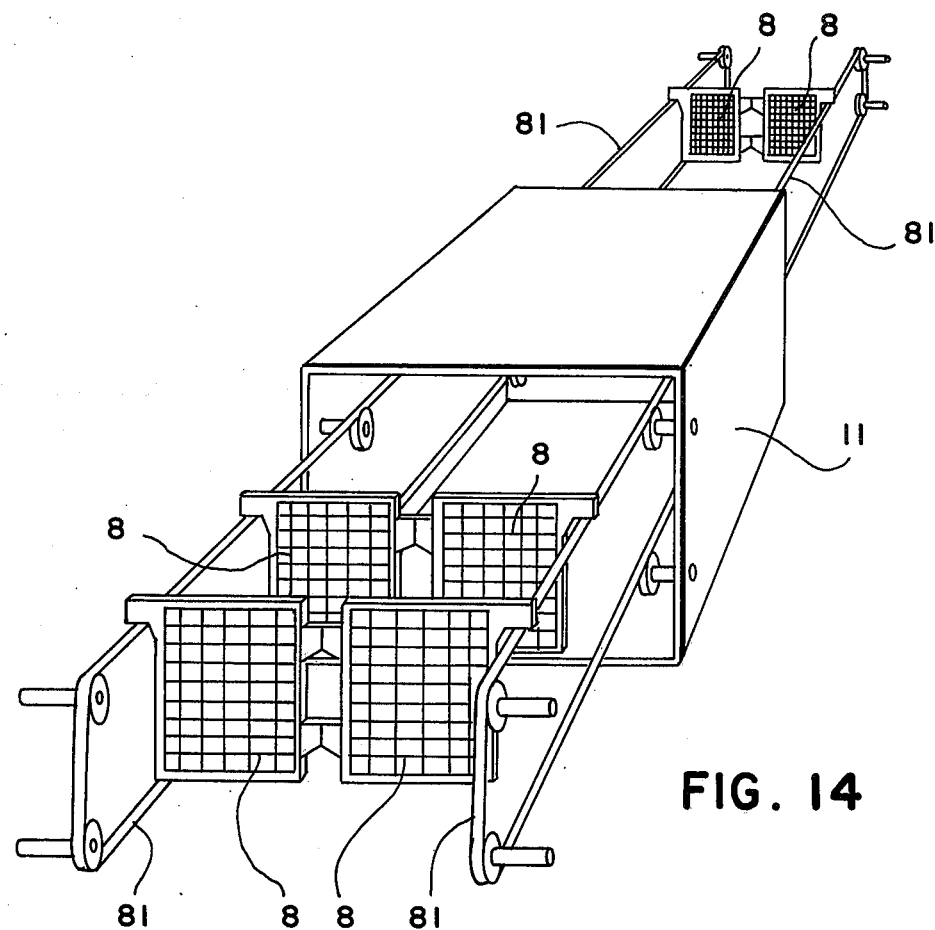
FIGS. 14 through 18 illustrate various embodiments and features of transport mechanisms in accordance with the invention.

Since twin grids are initially formed during plate manufacture, the simple conveyor belt arrangement of FIG. 14 may be used according to the invention. Either by hand or mechanically, the plates 8 are suspended from conveyor belts 81 by their lugs, one behind the other, spaced by a few millimeters.

Figure 15:
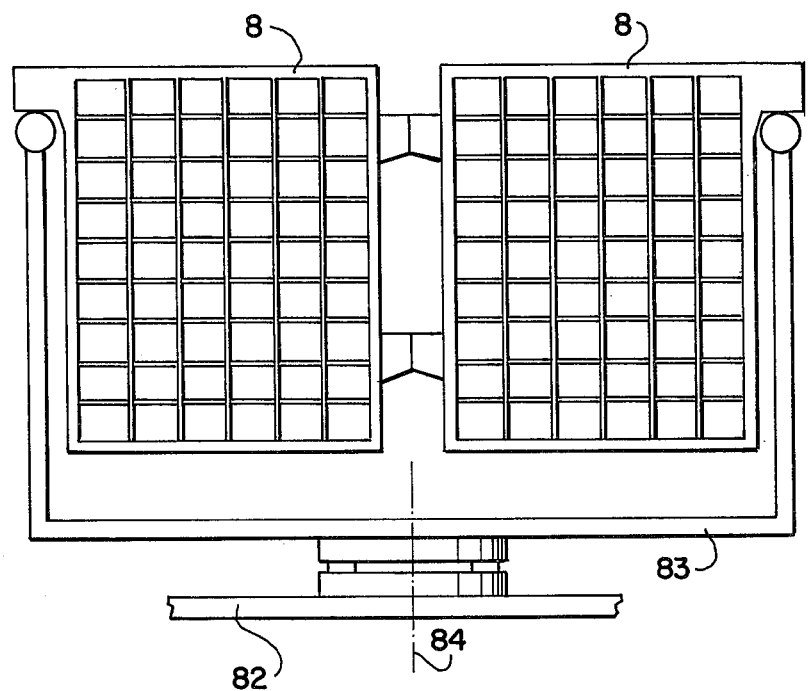

In case the plates have to pass through the tunnel parallel to the side walls, a carrier rack 83 as shown in FIG. 15 may be used, according to the invention. The width of this carrier rack 83 is determined by the width of the plates 8 or twin plates to be dried; the length of the carrier racks 83 must conform to the width of the drying tunnel.

The plates are positioned in closely spaced rows on the arms of carrier rack 83. Then, the rack is introduced into the into the drying tunnel in such a manner that the desired plate orientation relative to the tunnel walls and the magnetic field prevails.

It may be desirable to make the carrier rack rotatable about its vertical axis 84, so that the plates can be passed through the tunnel perpendicular as well as parallel to the side walls.

Figure 16:
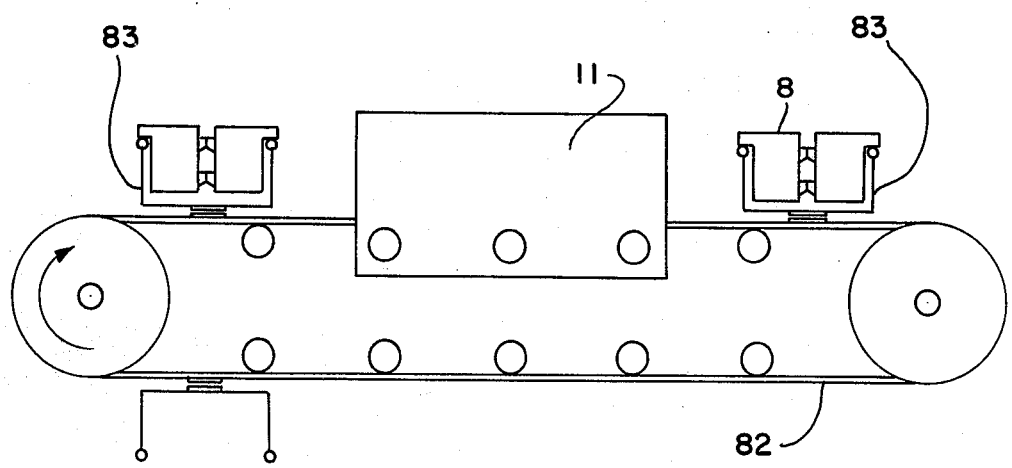

A plurality of carrier racks 83 can be arranged in a row on conveyor belt 82 as shown in FIG. 16. This conveyor belt is driven in known manner at variable speeds. The conveyor belt 82 is arranged in such a way that the emptied carrier racks 83 return automatically to the tunnel inlet outside of and preferably below the tunnel, after the dried plates have been removed. At the tunnel inlet, fresh plates are placed on the racks.

Figure 17:
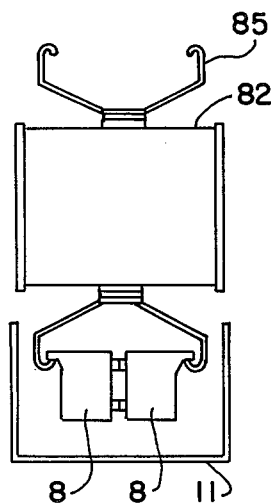
Figure 18:
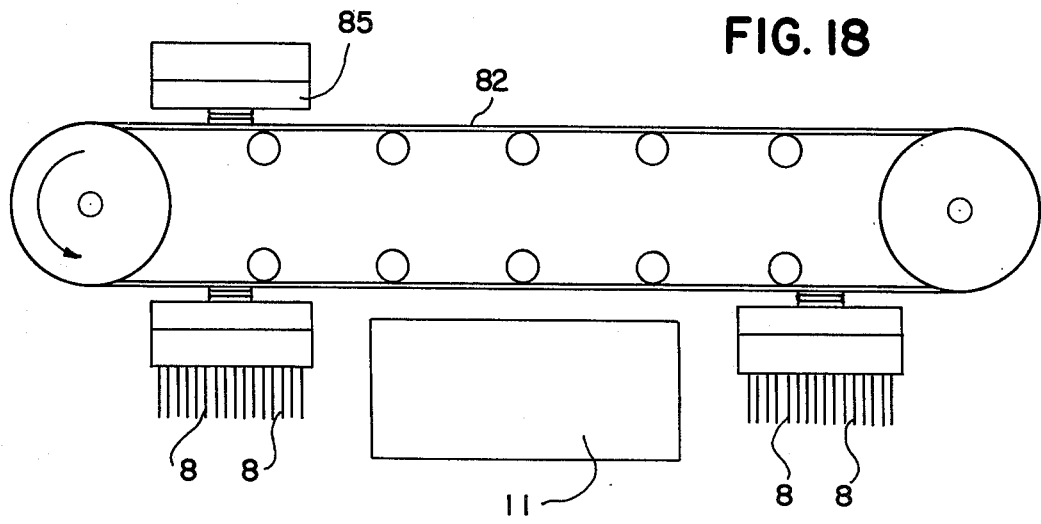

It is also possible, according to the invention, to replace the carrier racks 83 by lifting forks 85, also rotatably arranged as shown in FIGS. 17 and 18. In this embodiment, the plates 8 or twin plates are led hanging through the tunnel. These lifting forks may be constructed so as to accommodate up to one hundred twin plates at a time.

The lifting forks are so constructed that plates of various dimensions can be transported and that the fork arms have a secure grip from below on the plate lugs. The embodiment of FIGS. 17 and 18 also permits transport of plates through the tunnel perpendicularly as well as parallel to the tunnel side walls.

The conveyor belt, carrier racks, and lifting forks have to be made of a synthetic or other non-magnetic and non-electrically conductive material, so that they do not disturb the magnetic field within the tunnel and so that electrical voltages and currents are not induced in them.

We claim:

1. The method of drying storage battery plates having active mass pasted on lead grids, comprising the steps of:
   transporting said plates along a predetermined path; and
   producing an alternating magnetic field which traverses said path generally perpendicularly to said plates, and which alternates at frequencies below the high frequency range such that currents are induced in the short circuits formed by said grids without appreciable current displacement toward the marginal rods of the grids,
   thereby heating the grids rapidly and evenly over the entire plate area,
   the heating of each grid in turn heating the active mass pasted thereon from the inside and causing progressive drying of the mass from the inside toward the outside of the plates.

2. The method of claim 1, wherein said field is produced by alternating current at frequencies from about 50 to about 200 Hz.

3. The method of claim 2, wherein said field is produced with an intensity which is a function of plate thickness, and which preferably ranges from about 100 to about 1000 Gauss.

4. The method of claim 1, wherein said field is produced by a core and winding arrangement positioned along said plate transport path.

5. The method of claim 1, wherein said plates are transported oriented generally parallel to said path, and said field is produced generally at right angles to said path.

6. The method of claim 5, wherein said field is provided by three-phase excitation on opposite sides of the path, and oppositely directed on said opposite sides.

7. The method of claim 6, wherein said field has a pitch substantially equal to the width of the plates.

8. The method of claim 5 wherein the plates are transported in batches, successive batches following each other along the path, and the plates in each batch being spaced from each other across the width of the path.

9. The method of claim 1, wherein said plates are transported oriented generally perpendicular to said path and said field is produced generally parallel to the path.

10. The method of claim 9, wherein said field is produced by three-phase excitation on opposite sides of said path, and similarly directed on said opposite sides.

11. The method of claim 1, wherein said field is produced by three-phase electrical excitation, distributed linearly along said path.

12. The method of claim 1 wherein the plates are transported along the path without evacuating the path.

13. Apparatus for drying storage battery plates having active mass pasted on lead grids, comprising:
   means for transporting said plates along a predetermined path; and
   means for producing an alterating magnetic field within said path, said field being oriented generally perpendicularly to said plates along said path,
   said field producing means being constructed to produce alternation at frequencies below the high frequency range such that currents are induced in the short circuits formed by the lead grids without appreciable current displacement toward the marginal rods of the grids,
   thereby heating the grids rapidly and evenly over the entire plate area,
   the heating of each grid in turn heating the active mass pasted thereon from the inside and causing progressive drying of the mass from the inside toward the outside of the plates.

14. The apparatus of claim 13, further comprising a tunnel defining said path; and means for transporting said plates through said tunnel.

15. The apparatus of claim 14, wherein said field producing means comprises magnetic cores and windings adjacent said tunnel.

16. The apparatus of claim 15, wherein said cores terminate in pole pieces on opposite sides of said tunnel.

17. The apparatus of claim 15, wherein said cores terminate in pole pieces longitudinally spaced on the same side of said tunnel.

18. The apparatus of claim 17, wherein said windings are distributed so as to produce said field in said tunnel generally transverse to the tunnel sidewalls, while said plates are transported through said tunnel oriented generally parallel to said sidewalls.

19. The apparatus of claim 18, wherein the plates are transported in batches, successive batches following each other along the tunnel, and the plates in each batch being spaced laterally across the width of the tunnel.

20. The apparatus of claim 17, wherein said windings are distributed so as to produce said field in said tunnel generally parallel to the tunnel sidewalls, while said plates are transported through said tunnel oriented generally transverse to said sidewalls.

21. The apparatus of claim 20, wherein said windings are three-phase, linear exciter windings, distributed substantially along the whole length of the tunnel.

22. The apparatus of claim 21, wherein the windings on opposite sides of the tunnel are excited in the same phases.

23. The apparatus of claim 14, wherein said tunnel is open toward the bottom, and said windings are so placed as to permit access into said tunnel from the bottom.

24. The apparatus of claim 23, wherein the windings are placed adjacent the top and sides of the tunnel but not the bottom.

25. The apparatus of claim 24 wherein the windings encircle the tunnel on its top and sides, and complete their encircling loops by extending along the bottom of the tunnel sides and across the bottom of the tunnel ends.

26. The apparatus of claim 25 wherein the tunnel ends have openings of sufficient size for the passage of the plates.

27. The apparatus of claim 14, further comprising means for passing drying air through said tunnel.

28. The apparatus of claim 14, wherein said transporting means comprises conveyor belts and said plates comprise lugs by which they are hung on the belts for transport through said tunnel.

29. The apparatus of claim 28, wherein said transporting means comprises lifting forks for said plates.

30. The apparatus of claim 14, wherein said transporting means comprises carrier racks for said plates.

31. The apparatus of claim 14, wherein the tunnel is not evacuated.

32. The apparatus of claim 13, wherein the transporting path is not evacuated.

33. A battery plate having active mass pasted on a lead grid, and made by the method which includes the steps of
transporting the plate along a predetermined path, and
producing along said path an alternating magnetic field generally perpendicular to said plate, and which alternates at frequencies below the high frequency range such that currents are produced in the short circuits formed by the grid without appreciable current displacement toward the marginal rods of the grid,
thereby heating the grid rapidly and evenly over the entire plate area,
the heating of the grid in turn heating the active mass pasted thereon from the inside and causing progressive drying of the mass from the inside toward the outside of the plate.

34. The plate of claim 33, wherein the field alternates in a frequency range from about 100 to a few thousand Hertz.

35. The plate of claim 33, wherein the field alternates in a frequency range from about 50 to about 200 Hz.

36. The plate of claim 33, whose method of making includes the further step of introducing heated gas into the paths after drying of the mass by the heating of the grid has already progressed to a predetermined extent.

* * * * *